Figure 1:
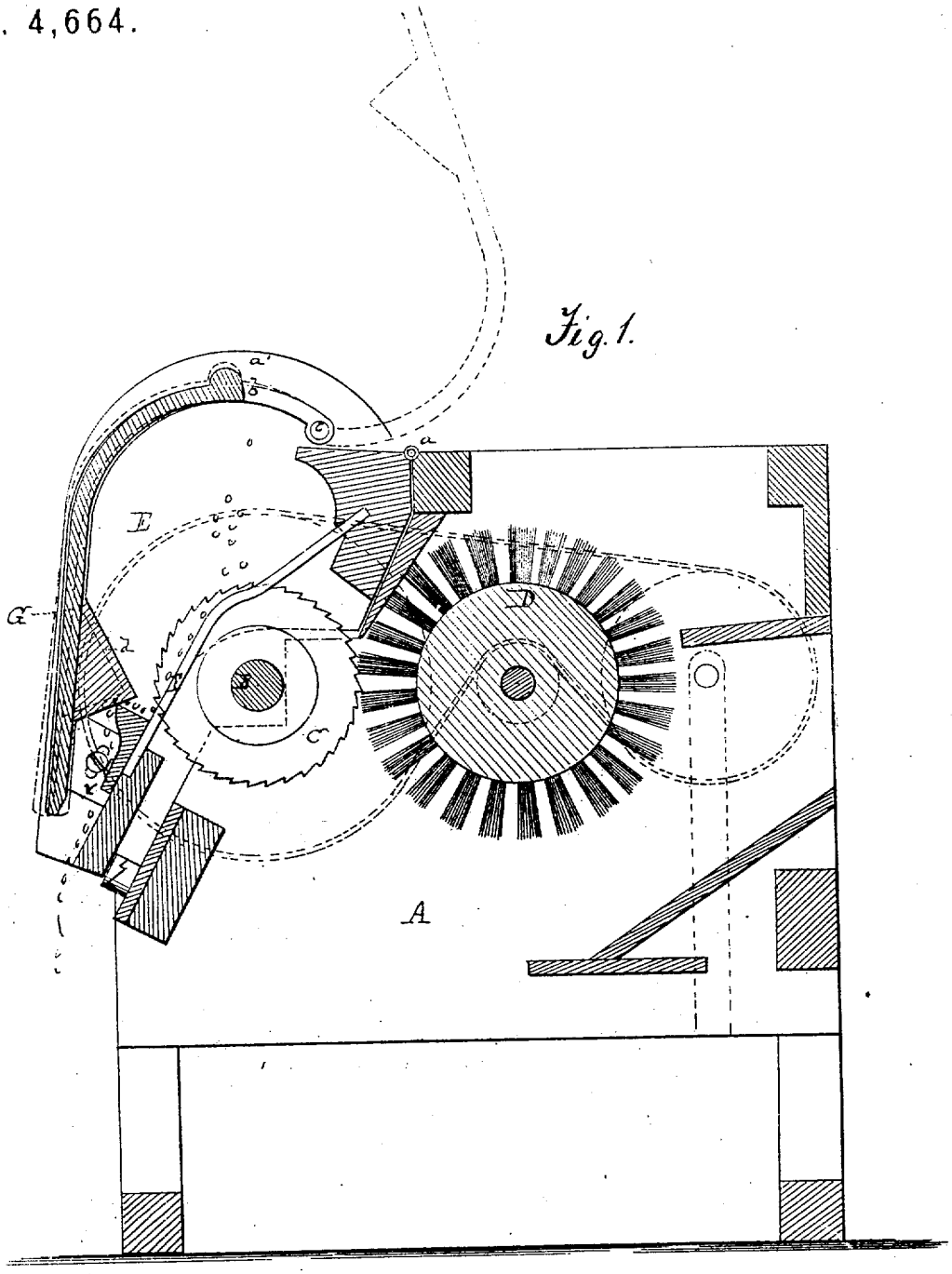

(41.)

2 Sheets.. Sheet 1.

DANIEL PRATT.

Improvement in Cotton Gins.

Reissued Dec. 12, 1871.

No. 4,664.

Witnesses.
Dennis Finney
W. H. Henderson

Inventor.
Daniel Pratt
by his attys.
Cox and Cox

AM. PHOTO-LITHOGRAPHIC CO. N.Y. (OSBORNE'S PROCESS.)

(41.)
DANIEL PRATT.
Improvement in Cotton Gins.
No. 4,664. Reissued Dec. 12, 1871.
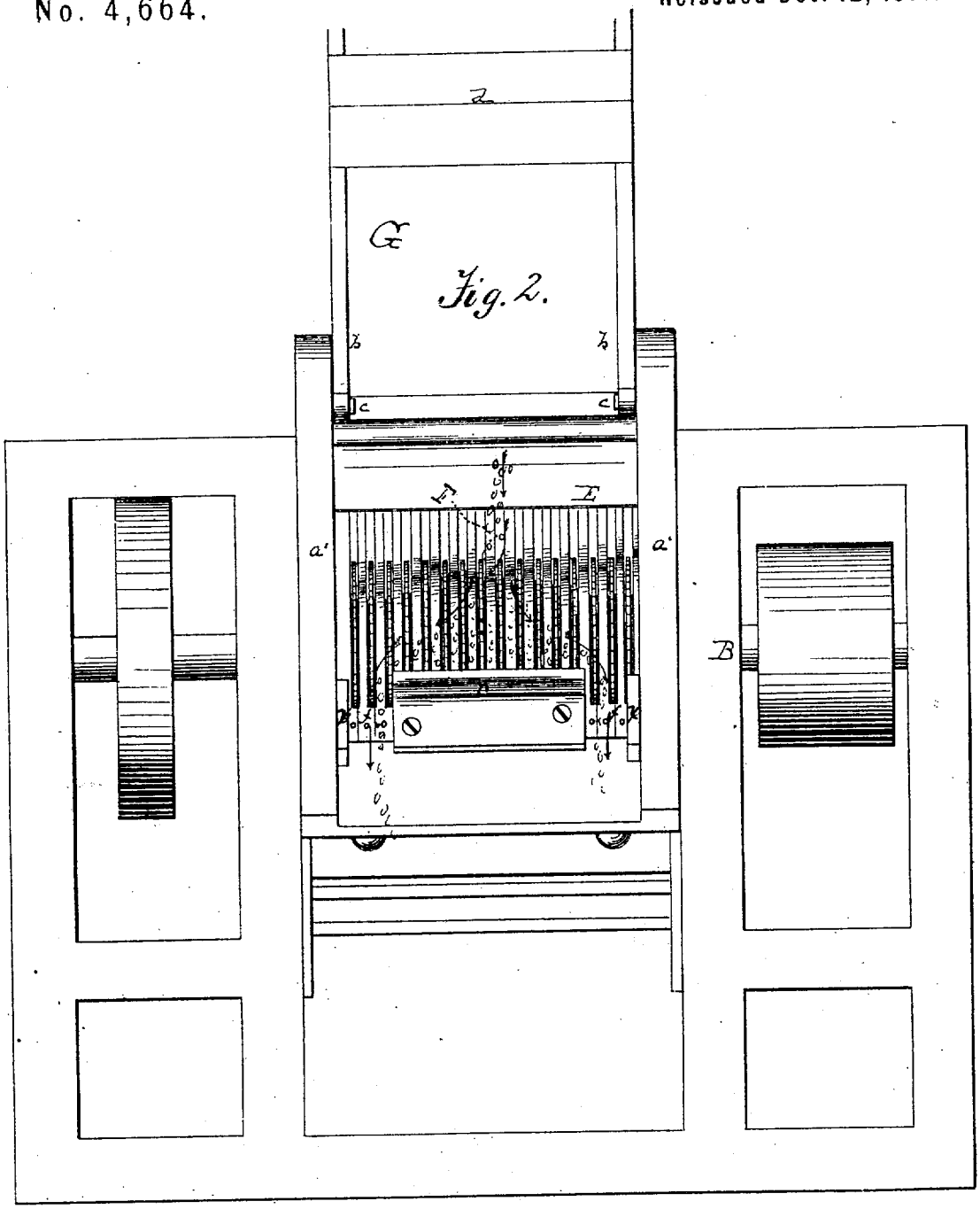
Witnesses.
Dennis Simmons
W. G. Henderson
Inventor.
Daniel Pratt
by his attys.
Pike and Cook
AM. PHOTO-LITHOGRAPHIC CO. N.Y. (OSBORNE'S PROCESS)

UNITED STATES PATENT OFFICE.

DANIEL PRATT, OF PRATTVILLE, ALABAMA.

IMPROVEMENT IN COTTON-GINS.

Specification forming part of Letters Patent No. 17,806, dated July 14, 1857; extended seven years; reissue No. 4,664, dated December 12, 1871.

*To all whom it may concern:*

Be it known that I, DANIEL PRATT, of Prattville, in the county of Autauga and State of Alabama, have invented certain new and useful Improvements in Cotton-Gins; and I do hereby declare that the following is a full, clear, and exact description of the same, reference being had to the annexed drawing making a part of this specification, in which—

Figure 1 is a vertical section of a saw-gin with my improvements applied. Fig. 2 is a front view of same.

Similar letters of reference indicate corresponding parts in the two figures.

In ginning cotton by what is known as the saw-gin the work is done with great rapidity, but the cotton is more or less deteriorated or injured by the action of the saws, which cut the staple to a greater or less extent, provided the cotton be thoroughly ginned. Hence, long staple cotton, Sea Island, is ginned by what is known as the roller-gin, which operates very slowly. The object of my invention is to remedy the difficulty above referred to, and allow the saw-gin to be used without cutting either the staple or the seeds. The invention consists in having the center portion of the lower part of the seed-box or hopper closed, an opening being left at each end, and the cotton fed into the box or hopper at its center, whereby a spiral movement is given the cotton within the box or hopper, and a fresh surface constantly presented to the saws so that the cotton will be stripped from the seed without being cut or broken.

To enable others skilled in the art to fully understand and construct my invention, I will proceed to describe it.

A represents a box or hopper, in which a saw-shaft, B, is placed. C represents the saws on the shaft B; and D represents the rotating stripping-brush, the shaft of which is parallel with the saw-shaft B. E represents the cotton-box or hopper, in which the breast F is placed, the saws C projecting through or between the ribs of the breast. The box or hopper E is hinged at its upper end to the case A, as shown at *a*, so that said box may be raised when required. The above parts are of usual construction, and therefore a more minute description is not requisite. G represents the outer side of the cotton-box or hopper. The upper end or part of this side G is of curved form, and it is provided at each side with metal bars, *b*, the upper ends of which project beyond the upper edge of the side G, the bars retaining their curved form beyond the end of the side, as shown plainly in Fig. 1. The upper ends of the bars *b* are pivoted to the inner sides *a'* of the cotton-box or hopper, as shown at *c*, in the upper part of the sides *a'* of the hopper E at a point in rear of the vertical longitudinal central plane of the saw-shaft B. To the lower part of the side G, and to its inner side a ledge or strip, *d*, is attached. This ledge or strip extends the whole width of the side, as shown in Fig. 2, the side G being elevated in this figure. To the inner or back side of the box or hopper E, and at the lower end of the breast F a projecting strip, *e*, is attached. This strip does not extend the whole width of the box or hopper. A space or passage, *f*, is allowed at each side between the ends of the strip and the sides of the hopper or box, as plainly shown in Fig. 2. In consequence of having the side G of the box or hopper E pivoted at its upper end, as shown, it will be seen that the side will be retained in contact with the rests *x* in proper position by its own gravity in consequence of the pivots *c* being so far at one side of the center of gravity of the side G. This will be understood by referring to Fig. 1. The side G with the shoulder *d* operates by its gravity to press the roll of cotton upon the saws C, and at the same time by its construction and being pivoted as aforesaid, to sustain and retain the roll of cotton in contact with the saws C. An adjustable wedge-shaped rest *x* having a slot and set-screw, by means of which it is operated, is provided on each side of the lower part of the breast F. When it is desired to give the side G a greater elevation or diminish its pressure upon the roll the rests *x* are moved downward, thus interposing a wider extent of material between the side G and breast F, a contrary movement of the rests increases the pressure of the side G upon the roll.

The cotton is fed in to the hopper or box E at its center, the bottom of the mass resting upon the strip *e*. As the saws C rotate, the cotton within the box or hopper will be turned by their action, and the cotton in the lower part of the hopper be moved laterally in both directions from the center of the box toward its sides, as indicated by the arrows in Fig. 2. The cotton, therefore, will move spirally from the center toward both ends of the box or hopper, the seeds passing through the passages *f f* at the sides of the hopper, the cotton, of course, being drawn by the saws between the ribs of the breast F, as usual. In case of a large accumulation of seeds within the hopper or box E the attendant may cause them to drop out or to be discharged freely at any time by merely raising the side G. By giving the cotton this spiral motion or movement within the hopper or box E fresh masses or portions are successively presented to the action of the saws, and all portions of the mass will be equally ginned.

In gins of usual construction, with one exception, the cotton has no lateral movement, and if the cotton be thoroughly ginned or the seed fully removed or separated, the fibre will be cut to a greater or less degree. The hoppers also often become choked or clogged with seed. By my improvement this difficulty is obviated by means of the hinged or jointed side G.

I am aware that a patent was granted to H. H. Fultz for a peculiar means for feeding the cotton spirally to the saws. Fultz employed oblique or spiral flanches placed within the box or hopper, the cotton being moved from one end of the box or hopper to the other. My invention, it will be seen, differs essentially from that of Fultz. It is less expensive, and the same result is obtained by far simpler means.

I do not claim feeding the cotton spirally to the saws irrespective of the means employed for effecting the purpose.

What I claim as my invention, and desire to secure by Letters Patent, is—

1. The ledge *e* secured or placed within the hopper-box E, as shown, so as to close the central portion of the lower end of the hopper or box, and cause the cotton, when fed into the box as described, to be fed spirally to the saws from the center of the box toward each end for the purposes described.

2. The side G, provided with the ledge *d* and swinging on pivots *c* placed in rear of the longitudinal vertical central plane of the saw-shaft B, substantially as shown and described.

3. The swinging hopper E, provided with the adjustable wedge-shaped rests *x* in combination with the side G, provided with the shoulder *d* and pivoted, as shown substantially as described and specified.

4. The adjustable slotted wedge-shaped rests *x*, when arranged and used substantially as shown and described.

In testimony that I claim the foregoing improvement in cotton-gins, as above described, I have hereunto set my hand and seal this 14th day of September, 1871.

DANIEL PRATT.

Witnesses:
H. F. De Bardeleben,
J. W. Mathews.

(41)